L. H. ROBINSON.
APPARATUS FOR HANGING WINDOW SHADES.
APPLICATION FILED APR. 2, 1914.
1,121,290. Patented Dec. 15, 1914.
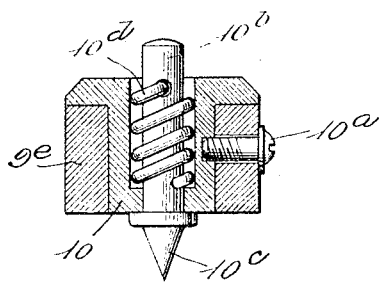
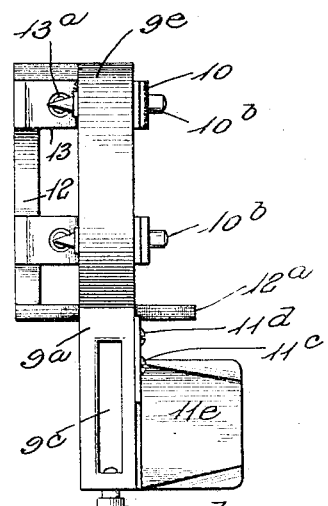
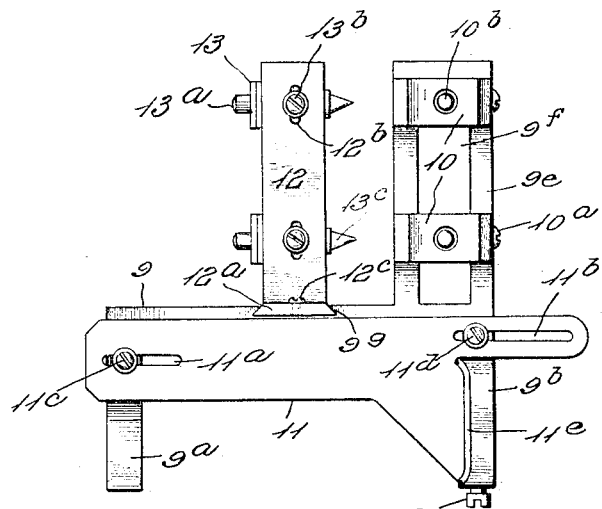
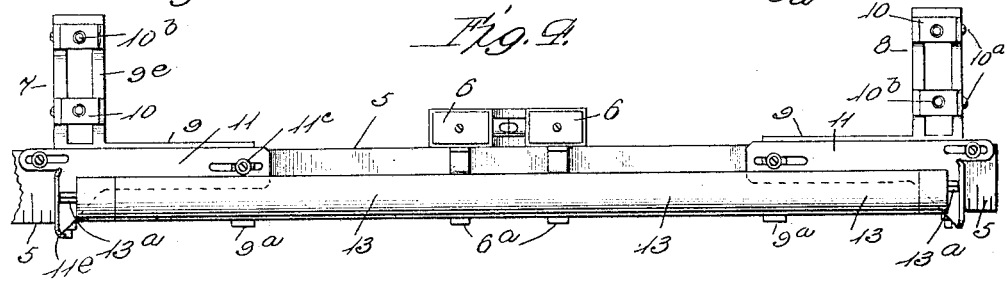
WITNESSES:
Wm Harold Eichelman
M. A. Milord
INVENTOR:
Lester H. Robinson
BY Frederick Benjamin
ATTORNEY.
THE NORRIS PETERS CO., PHOTO-LITHO., WASHINGTON, D. C.

UNITED STATES PATENT OFFICE.

LESTER H. ROBINSON, OF AURORA, ILLINOIS.

APPARATUS FOR HANGING WINDOW-SHADES.

1,121,290.  Specification of Letters Patent.  Patented Dec. 15, 1914.

Application filed April 2, 1914. Serial No. 828,985.

*To all whom it may concern:*

Be it known that I, LESTER H. ROBINSON, citizen of the United States, residing at Aurora, in the county of Kane and State of Illinois, have invented certain new and useful Improvements in Apparatus for Hanging Window-Shades, of which the following is a specification.

My invention relates to means for facilitating the hanging of window shades and its object is to provide a device which will enable the workman to accurately place the shade roller brackets so that the roller will be supported at a right angle to the sides of the window frame, and the brackets will be fixed at the proper distance apart.

A further object of my invention is to provide a device that can be used in measuring or indicating the proper positions for brackets, on both the outer and inner faces of the window frame.

A still further object of my invention is to provide indicating devices of the class mentioned that may be adjusted to brackets of the various types and sizes on the market in which the screw or nail receiving holes are not spaced the same.

Having the aforegoing and other objects of general utility in view, I have invented the device which I have shown in preferred form in the accompanying drawing, in which:—

Figure 1 is a sectional enlarged detail of the impression spur which forms an important feature of my device; Fig. 2 is an elevation of one of the gage members employed in my invention; Fig. 3 is an elevation at right angles to Fig. 2; Fig. 4 shows in front elevation, the various members of my apparatus assembled and in operative position relative to a shade roller.

Referring to the details of the several figures shown in the drawing, the reference characters indicate the following features:—

A yard-stick of well known form is represented by the numeral 5, and upon it is slidably mounted the members which, when combined as hereinafter described, constitute my complete apparatus.

6 represents a spirit level device which is provided with arms 6ª, slotted to receive the stick 5. This level may be of any suitable construction, and as such devices have been commonly used with rules and yard sticks, I do not claim it, *per se*, as my invention.

7 and 8 represent respectively and generally, the left and right hand gage members which are essential features of my invention and are duplicates except in the arrangement of one of the gage plates, as clearly appears in Fig. 4. In each gage, 9 represents a cast metal plate which constitutes the body of the gage and is formed with parallel legs 9ª, 9ᵇ, through which are rectangular slots 9ᶜ. The leg 9ᵇ is tapped at its outer end to receive a set-screw 9ᵈ. The plate 9 is also formed with an extension 9ᵉ in which there is a rectangular opening 9ᶠ, and a dove-tail groove 9ᵍ is cut in the upper face of the plate.

Blocks 10 are adjustably fitted to the extensions 9ᵉ, and are held in place by screws 10ª which pass through slots in one wall of the extension. In each block is arranged a spur 10ᵇ, which is formed with a conical point 10ᶜ, and a flange 10ᵉ, and is yieldingly held in place by a coil spring 10ᵈ, as clearly shown in Fig. 1.

11 represents a sheet metal plate, in which are slots 11ª, 11ᵇ, to receive the screws 11ᶜ, 11ᵈ, by which the plate 11 is adjustably connected with the base plate 9. The plate 11 is formed with the lip 11ᵉ, which projects at right angles from the plate, and near one end thereof.

12 represents a cast metal plate formed with an angular foot 12ª, which slidably engages the groove 9ᵍ in the plate 9. The plate 12 is also provided with slots 12ᵇ to receive the screws 13ᵇ, which engage and hold in place the blocks 13, in which the spurs 13ª are mounted, said blocks, slots and spurs corresponding with the construction above described in respect to the plate 9. The foot 12ª is slotted as indicated by dotted lines, Fig. 2, to receive a screw 12ᶜ, by which it is adjustably secured to the plate 9, when it is desired to use the member 12. When the latter is not required, it is detached by removing the screw and sliding the foot 12ª from the groove 9ᵍ.

In using my shade-roller gaging apparatus, I mount the spirit level 6 and gage members 7 and 8, on a yard stick 5, in the manner indicated in Fig. 4. I then place the shade roller so that its pintles 13ª touch the lips 11ᵉ, suitably adjusting the plates 11 by loosening the screws 11ᶜ, 11ᵈ. The roller is then removed, and I place the complete apparatus across the face of the top piece of the window frame (when the brackets are to be attached to the outer face) and see that the extensions 9ᵉ are equally distant from the side edges of the window frame, and that the level 6 shows the stick 5 to be in a true horizontal plane. I then tap the spurs 10ᵇ with a hammer so that their points enter the face of the frame sufficiently to indicate the points at which the bracket screws or nails are to enter.

When it is desired to place the shade roller brackets on the inner face of the window frame, I attach the plates 12, and slide them to a position where the spurs will enter the frame at the desired distance from its outer face, using the level 6 to get the plates 12 in the same horizontal plane.

It will be obvious that where a number of shades of the same width are to be hung, a single adjustment of the gages 7, 8, on the stick, and of the plates 11, on the gages, will suffice for all.

It will be noted that the extensions 9ᵉ, are at true right-angles with the horizontal portions 9, thus enabling the eye of the user to determine the proper alinement of the bracket holes relative to the edges of the window frames, without resort to the level.

The distance between the vertical planes of the spurs 10ᵇ and the lips 11ᵉ, corresponds with the distance between the screw holes and the pintle receiving sockets of the ordinary shade-roller brackets.

I claim as my invention:—

1. In means for hanging window shades, in combination with a supporting stick, a pair of gage plates adjustable on the stick, spurs on said plates adapted to be driven into the window frame, and lateral extensions mounted on said plates adapted to engage the ends of the shade-roller pintles.

2. In means for hanging window shades, in combination with a supporting stick, a leveling device on said stick, a pair of gage plates adjustable on the stick, spurs on said plates adapted to be driven into the window frame, and lateral extensions mounted on said plates adapted to engage the ends of the shade roller pintles.

3. In means for hanging window shades, in combination with a supporting stick, a pair of gage plates mounted on said stick, spurs on said plates adapted to be driven into the window frame, members adjustable on said gage plates and having extensions adapted to engage the pintles of a shade roller.

4. In means for hanging window shades, in combination with a supporting stick, a pair of gage plates mounted on said stick, spurs adjustably mounted on said plates and adapted to be driven into a window frame, and pintle engaging means on said gage plates.

5. In means for hanging window shades, in combination with a supporting stick, a pair of gage plates mounted on said stick, spurs adjustably and removably mounted on said plates, and pintle engaging means adjustably arranged on said plates.

In testimony whereof I affix my signature in the presence of two witnesses.

LESTER H. ROBINSON.

Witnesses:
N. BABSON,
PHILL DEIBACH.

Copies of this patent may be obtained for five cents each, by addressing the "Commissioner of Patents, Washington, D. C."